No. 733,399. PATENTED JULY 14, 1903.
F., R. & O. KAMPFE.
SAFETY RAZOR.
APPLICATION FILED FEB. 19, 1903.
NO MODEL. 2 SHEETS—SHEET 1.
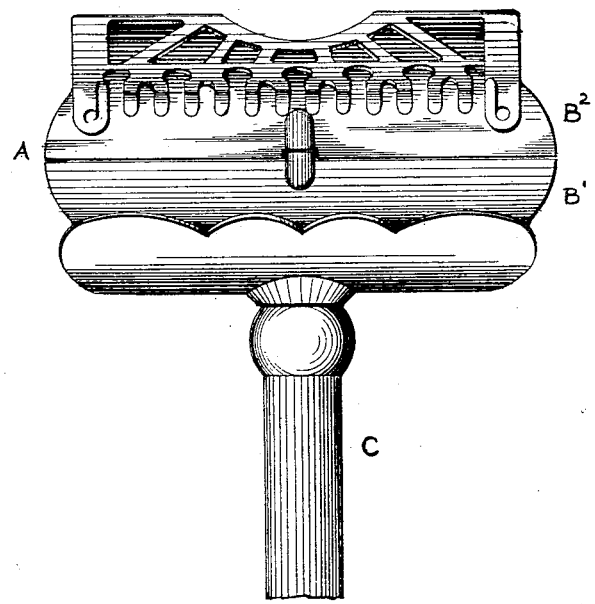
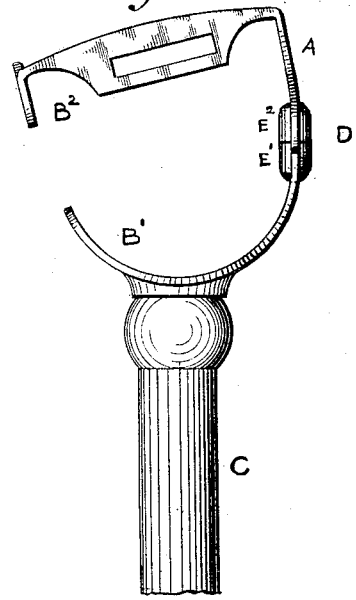
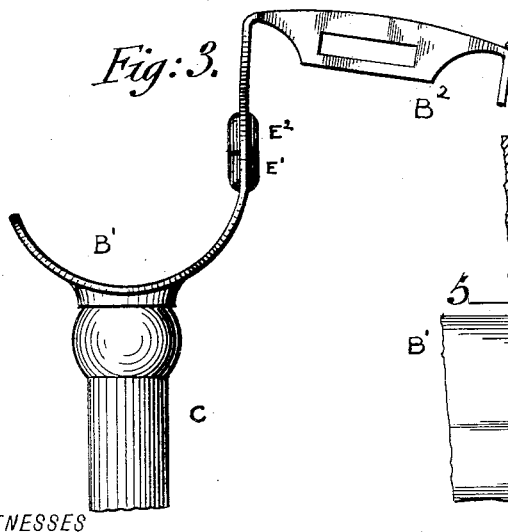
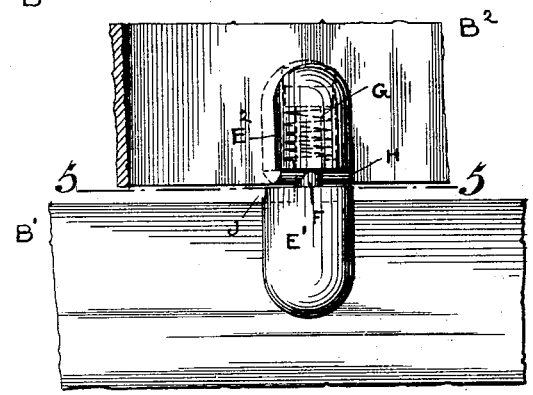
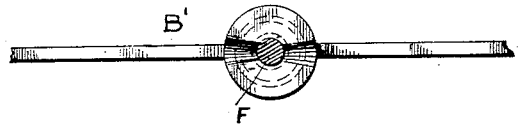
WITNESSES
INVENTORS
F. Kampfe
R. Kampfe
O. Kampfe
by Oscar ——
their ATTORNEY

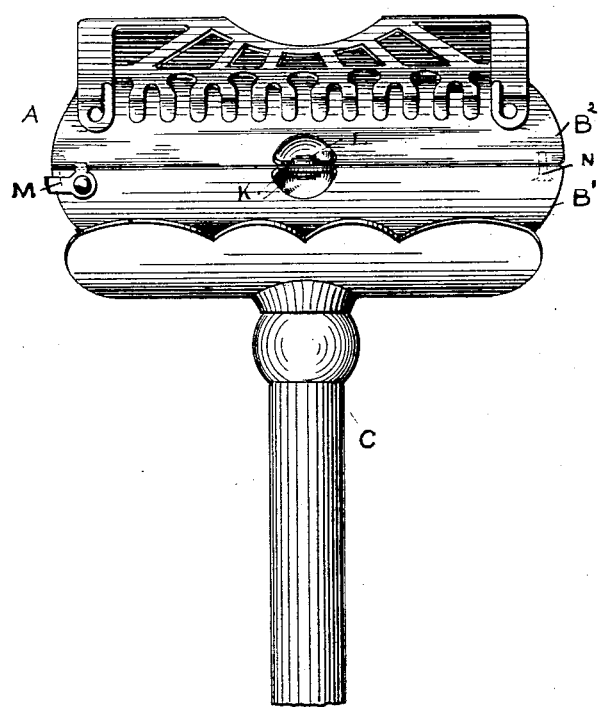
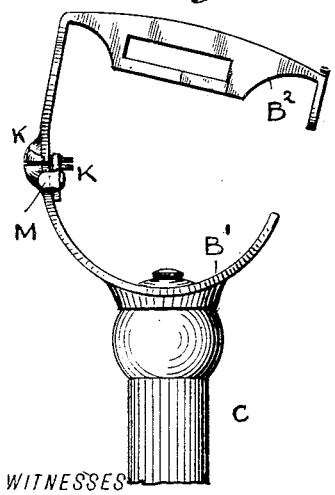
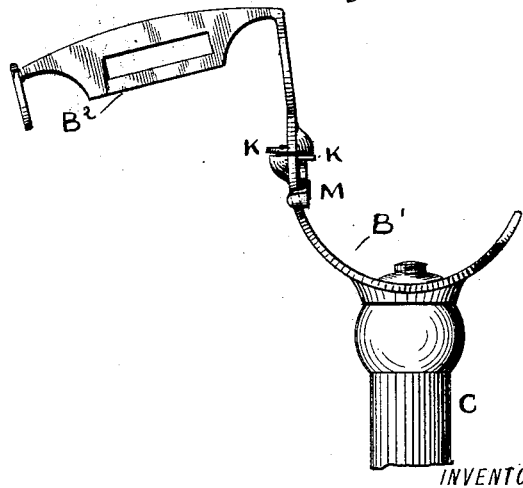

No. 733,399. Patented July 14, 1903.

UNITED STATES PATENT OFFICE.

FREDERICK KAMPFE, RICHARD KAMPFE, AND OTTO KAMPFE, OF NEW YORK, N. Y.

SAFETY-RAZOR.

SPECIFICATION forming part of Letters Patent No. 733,399, dated July 14, 1903.

Application filed February 19, 1903. Serial No. 144,023. (No model.)

*To all whom it may concern:*

Be it known that we, FREDERICK KAMPFE, RICHARD KAMPFE, and OTTO KAMPFE, citizens of the United States, residing at the city of New York, in the borough of Brooklyn, county of Kings, and State of New York, have invented certain new and useful Improvements in Safety-Razors, of which the following is a specification.

This invention relates to improvements in safety-razors; and the object of our invention is to provide a safety-razor of a novel construction which can be readily opened up for the purpose of cleaning and wiping it, can readily be closed after such cleaning and wiping, renders the guard, guard-teeth, and entire interior of the casing very accessible, is simple in construction, and handy in use.

In the accompanying drawings, in which like letters of reference indicate like parts in all the figures, Figure 1 is a front view of one construction of our improved safety-razor, the blade and blade-retaining clips being omitted and the casing being shown closed. Fig. 2 is an end view of the same in the same position. Fig. 3 is an end view of the same, the casing being opened. Fig. 4 is an enlarged detail side elevation of the pivot construction, the casing being open. Fig. 5 is a sectional plan view on the line 5 5 of Fig. 4. Fig. 6 is a front elevation of a modification of the construction, the casing being closed. Figs. 7 and 8 are end views of the same, closed and opened, respectively.

The razor-casing A of the conventional construction is substantially U-shaped in cross-section and is composed of a lower section B' and an upper section B², the lower section serving to receive the lather and the upper section serving to support the blade, which is not shown. The lower section may be provided with a handle C of any desired shape or construction, the conventional rod-handle secured to the central part of the bottom section being here shown. So as to permit of opening up the casing to fully expose the upper surface of the lower section and the under surface of the upper section the two sections B' and B² are connected with each other by a pivot or hinge connection D, so constructed, mounted, and arranged that the upper section B² can turn on the lower section B' in a plane extending from front to rear of the casing the entire length thereof. As shown in the particular construction illustrated in Figs. 1 to 5, this hinged connection D is arranged at the center of the rear wall, so that the upper section turns on a central pivot on the rear wall of the lower section. In the normal position the upper section extends over the bottom section, as shown in Fig. 2, and when the casing is to be opened the upper section is turned on its pivot one hundred and eighty degrees, so that the upper section now extends in the direction diametrically opposite to that in which it extended when over the lower section, as shown in Figs. 3 and 8. To close the casing, the upper section is swung back one hundred and eighty degrees into its original position. As shown in Figs. 1 to 5, a tubular part E' is formed in the rear wall of the lower section at the top edge and a like part E² in the bottom edge of the rear wall of the upper section, which tubular parts are in line, and a pivot F is held longitudinally in said tubular sections in such a manner that one of the sections can have a movement to a greater or less extent in the direction of the length of the pivot—that is to say, toward and from the other section. A helical spring G surrounds this pivot in one or both tubular projections E and serves to draw the two sections B' and B² toward each other in the direction of the length of the pivot. For the purpose of locking the sections together, either when the casing is closed or when it is opened, one of the tubular projections is provided at the exposed end—that is, at the edge of the rear wall of the section—with a transverse beveled ridge or knife-edge H, parallel with and in line with the edge of the said wall, and the other tubular projection is provided with a corresponding groove J, parallel with and in line with the edge of the rear wall of its section. The depths of said ridge and groove are such that when this ridge or knife-edge rests within this groove the rear edges of the upper and lower sections will be in contact. When the upper section is turned for the purpose of opening or closing the casing, the beveled ridge H rides upon the sides of the inclined groove, and this separates the rear edges of the two sections slightly in the direction of the length of the pivot and holds them apart until the upper section has been turned one hundred and eighty degrees, and as soon as the beveled ridge or knife-edge H is again in line with the groove J the spring G draws the edges of the rear walls of the two sections into contact, and thus locks the parts against accidental displacement and until they are forcibly displaced by turning one or the other on the pivot F. All that is necessary to open the casing is to turn one section on the other one hundred and eighty degrees, and when such turn has been completed the two sections are automatically locked in relation to each other and in the positions in which they have been placed.

In the construction shown in Figs. 6, 7, and 8 the two sections B' and B² are provided at their rear edges with lugs K, which may be formed by forcing out part of the metal or in any other suitable manner, which lugs rest flat upon each other. Through these lugs the pivot L is passed, on which one section can be turned on the other in the manner previously described. For the purpose of locking the two sections in place the finger-latch M is pivoted to the inner surface of the rear wall of the lower section near one side, and a stop N projects beyond the bottom edge of the upper section at the opposite end of the casing. When the latch M is adjusted so as to release the upper section, one section can be turned on the other in a plane extending from front to rear sufficiently to open up the casing and guard and to permit the ready removal of the lather both from the casing and guard by fully exposing the upper surface of the bottom section of the casing and the under side of the upper section, and thus permitting a thoroughly wiping and drying of all these parts in the most perfect manner. It should be noted that on account of the stop N the sections cannot be turned one hundred and eighty degrees when opened.

Having described our invention, what we claim as new, and desire to secure by Letters Patent, is—

1. A safety-razor having a casing formed of two sections which are pivotally connected to permit of turning one section in relation to the other in a plane intersecting the vertical transverse plane of the casing, substantially as set forth.

2. A safety-razor, having a casing formed of an upper and lower section, which are pivotally connected to permit of turning one section in relation to the other, in a plane extending in the direction from front to the rear of the casing, substantially as set forth.

3. A safety-razor having a casing formed of an upper and lower section, which are pivotally connected to permit of turning one section in relation to the other, in a plane extending in the direction from front to the rear of the casing, and means for locking said sections in fixed positions in relation to each other, substantially as set forth.

4. A safety-razor having a casing formed of an upper and lower section which are pivotally connected to permit of turning one section in relation to the other, in a plane extending in the direction from front to the rear of the casing, and means for automatically locking said sections in fixed positions in relation to each other, substantially as set forth.

5. In a safety-razor, the combination with a lower section and an upper section, the latter being provided with a guard, of a pivot connection between said two sections, in the rear walls of said sections to permit of turning the sections in relation to each other in a plane extending in the direction from front to rear of the casing formed by the two sections, substantially as set forth.

6. In a safety-razor, the combination with a lower casing-section and an upper casing-section, the latter provided with a guard, of a pivot connection for said two sections at the free edges of the rear walls of said section, which pivot connection extends through a plane from the front to the rear of the casing whereby one section can be turned on the other in a plane extending in the direction from the front to the rear of the casing, substantially as set forth.

7. In a safety-razor, the combination with a lower and upper section, the latter provided with a guard, of a pivot-support formed in the rear wall of each section, at the meeting edges, and a pivot passed through said pivot-supports, substantially as set forth.

8. In a safety-razor, the combination with a lower and upper casing-section, the latter provided with a guard, a tubular pivot-support being provided in the rear wall of each section, a pivot in said pivot-supports, and a spring surrounding said pivot and drawing the two sections toward each other, substantially as set forth.

9. In a safety-razor, the combination with a lower and upper casing-section, the latter provided with a guard, a tubular pivot-support provided in the rear wall of each section, one of said pivot-supports having a ridge at its free end and the other a groove, a pivot-pin in said pivot-supports on which pivot-pin one section can turn and can also move in the direction of the length of the pivot-pin, and a spring for drawing the sections toward each other in the direction of the length of the pivot-pin, substantially as set forth.

In testimony whereof we have signed our names to this specification, in the presence of two subscribing witnesses, this 17th day of February, 1903.

FREDERICK KAMPFE.
RICHARD KAMPFE.
OTTO KAMPFE.

Witnesses:
OSCAR F. GUNZ,
PETER J. DICKE.